United States Patent [19]

Eumann et al.

[11] Patent Number: 4,601,808
[45] Date of Patent: Jul. 22, 1986

[54] APPARATUS FOR DESALTING WATER BY ELECTRODIALYSIS

[75] Inventors: Hanns-Heinz Eumann, Lerchenweg 1, D-7034 Gärtringen; Winfried Blank, Gäufelden, both of Fed. Rep. of Germany

[73] Assignee: Hanns-Heinz Eumann, Gärtringen, Fed. Rep. of Germany

[21] Appl. No.: 731,067

[22] Filed: May 6, 1985

[30] Foreign Application Priority Data

May 16, 1984 [DE] Fed. Rep. of Germany ....... 3418102
Nov. 13, 1984 [DE] Fed. Rep. of Germany ....... 3441419

[51] Int. Cl.$^4$ .............................................. B01D 13/02
[52] U.S. Cl. .................. 204/301; 204/182.5; 204/260
[58] Field of Search ................. 204/182.5, 260, 301

[56] References Cited

U.S. PATENT DOCUMENTS

| | | | |
|---|---|---|---|
| 2,906,685 | 9/1959 | Stoddard et al. | 204/301 |
| 2,938,849 | 5/1960 | Stoddard | 204/301 |
| 3,192,148 | 6/1965 | Chen | 204/301 |
| 3,645,884 | 2/1972 | Gilliland | 204/301 |
| 3,764,499 | 10/1973 | Okubo et al. | 204/182.5 |
| 3,891,532 | 6/1975 | Jensen et al. | 204/260 |
| 3,920,534 | 11/1975 | Jensen et al. | 204/301 |
| 4,013,554 | 3/1977 | Reis et al. | 204/182.5 |
| 4,165,273 | 8/1979 | Azarov et al. | 204/182.5 |

Primary Examiner—John F. Niebling
Assistant Examiner—Terryence Chapman
Attorney, Agent, or Firm—Becker & Becker, Inc.

[57] ABSTRACT

An apparatus for desalting water by electrodialysis. The apparatus includes a circular cylindrical tank in which are provided a central electrode which extends along the axis of the tank, a coaxial electrode chamber which embeds the central electrode in electrolyte solution, a coaxial resin chamber which contains ion exchange resin, and a coaxial brine chamber. The separation of adjoining chambers is effected by respective membranes, which are permeable to either cations or anions. The brine chamber is disposed between the resin chamber and the electrode chamber which contains the central electrode. A further electrode chamber, which is designed for receiving another electrolyte solution, is disposed between the resin chamber and the wall of the tank. This further electrode chamber is hollow cylindrical.

8 Claims, 1 Drawing Figure

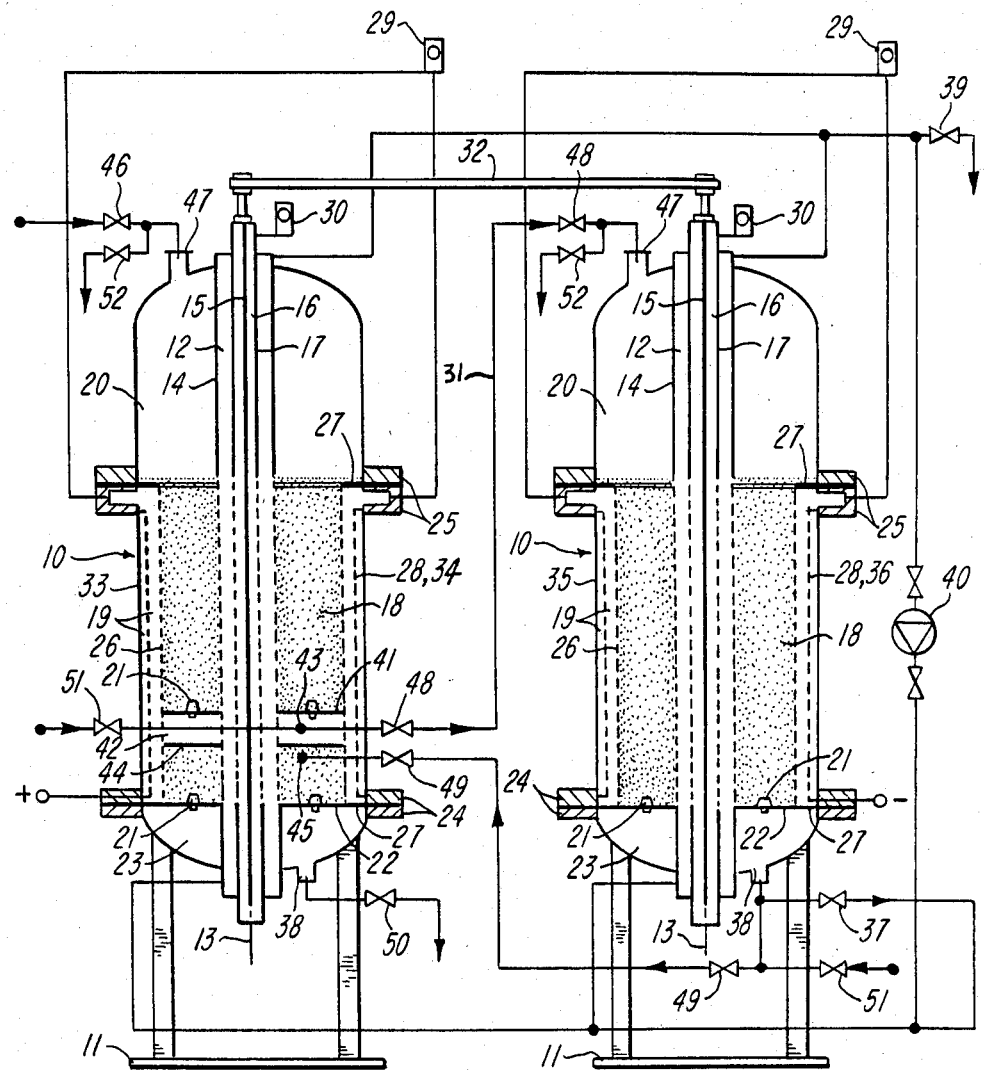

APPARATUS FOR DESALTING WATER BY ELECTRODIALYSIS

BACKGROUND OF THE INVENTION

1. Field of the Invention

The present invention relates to an apparatus for desalting or softening water by electrodialysis; the apparatus includes a circular cylindrical tank in which are provided a central electrode which extends along the axis of the tank, a coaxial electrode chamber which embeds the central electrode in electrlyte solution, a coaxial resin chamber which contains ion exchange resin, and a coaxial brine chamber; the separation of adjoining chambers is effected by respective membranes, which are permeable to either cations or anons.

2. Description of the Prior Art

An apparatus of this general type embodies the combination of ion exchange material with a dialysis device and an electrolysis device. Characteristic of this combination is the continuous regeneration of the ion exchange material by the motive force of the electrical field and the separation action of the respectively adjoining membrane. In contrast, with a conventional ion exchanger, a regeneration phase and a wash phase follow a loading phase, considerable quantities of regeneration chemicals are required, considerable drainage or waste water losses result, the exchange or reversing process is generally provided with a second unit, and extensive control devices are required.

U.S. Pat. No. 3,686,089 Korngold et al dated Aug. 22, 1972 discloses an apparatus for desalting water by electrodialysis, according to which a tank is divided by membranes, which are either permeable to cations or to anions, into successive chambers for cation resin, anion resin, brine, an anode, and a cathode. Not only the anode chamber and the cathode chamber but also the cation resin chamber and the anion resin chamber are spaced from one another by the brine chamber, and the cation resin chamber and the anion resin chamber are connected in series by a connecting line for the partially desalted water. All of the membranes have a planar arrangement, have the same rectangular cut, and are disposed parallel to one another. The same also applies for the chambers for the cation resin, the anion resin, the brine, an anode, or a cathode, which chambers are partitioned by the membranes. A drawback of this heretofore known apparatus is that it requires four charging spaces, the maintenance of a given chamber frequently requires dismantling of the entire apparatus, sealing to a higher operating pressure causes difficulties, no uniform distribution of the liquid, which is to be treated and enters from above, is possible, the shunting of the gases which are formed is too irregular, increasing irregularities in the phase profile of a given ion exchange bed, which tend to escape of ions, cannot be corrected in a simple manner, and deposits which increase the resistance of the ion exchange bed to flow can be removed only at great expense.

An apparatus of the initially defined type is disclosed in co-pending German Patent Application No. 34 18 102.4, filed May 16, 1984 belonging to the assignee of the present invention and included as basis for the present disclosure. With this apparatus, the aforementioned tank comprises two circular cylindrical tanks, two or more flange junctions which extend radially relative to both of the tanks, and successively arranged in the radial direction in one of the tanks a circular cylindrical anode chamber, a hollow cylindrical cation resin chamber, and a hollow cylindrical brine partial chamber, and in the other tank a circular cylindrical cathode chamber, a hollow cylindrical anion resin chamber, and a hollow cylindrical brine partial chamber; the brine chamber is completed by the interior of the flange junctions. However, with this arrangement one cannot selectively utilize a given separate tank as a simple ion exchanger, i.e. as a cation exchanger or as an anion exchanger. This short coming in versatility complicates the applicability for apparatus for desalting water by electrodialysis, and precludes a more economical mass production. Furthermore, due to circulation in the brine chamber, it is difficult to obtain a greater homogeneity in the brine concentration, which is necessary for a greater efficiency of the apparatus. Moreover, in the region of the brine, limits are set for shortening the electrical field lines, and hence also for reducing the electrical rsistance and the operating costs of the apparatus.

An object of the present invention is to provide an apparatus for desalting water by electrodialysis, which aparatus is economical to manufacture and operate, has a versatile applicability, has a high efficiency when treating aqueous liquids, is convenient to transport, can operate with a small charging space, is not very susceptible to disturbance, and makes possible a simple maintenance.

Brief Description of the Drawing

This object, and other objects and advantages of the present invention, will appear more clearly from the following specification in conjunction with the accompanying drawing. The view of the drawing represents an arrangement of apparatus having features in accordance with the present invention and partially schematically illustrates one particularly preferred specific embodiment of the present invention.

SUMMARY OF THE INVENTION

The apparatus of the present invention is characterized primarily in that the brine chamber is disposed between the resin chamber and the electrode chamber which contains the central electrode, and in that a hollow cylindrical further electrode chamber, which is designed for receiving another electrolyte solution, is disposed between the resin chamber and the wall of the tank.

This inventive type of construction of an apparatus for desalting water by electrodialysis makes it possible for two tanks, which are sequentially coupled by a transfer pipe, to be connected at their central electrodes by a bus bar, and for the anode to be disposed in the outer electrode chamber of that tank which is designed as the cation exchanger and the cathode to be disposed in the outer electrode chamber of the other tank, which is designed as the anion exchanger. As a result, the electrial force lines which lead from one tank to the other tank in the brine have to bridge only extremely short distances, which shows up in a reduction of the electrical resistance, which in turn reduces the operating costs of the apparatus. In addition, due to a brine circulation which is common for both tanks, a greater homogeneity can be more quickly achieved in the brine cncentration, which is further conductive to a greater efficiency of the apparatus. Shifting from a tank having chambers which are parallel to one another to a tank having chambers which are coaxially arranged makes it easier to seal the system for a higher operating pressure, facilitates the uniform distribution of the liquid which is to be treated over the cross-sectional area of the respective ion exchange bed, and facilitates the withdrawal of the gases which form in the electrode chambers. Relatively large quantities of ion exchange resin can be accommodated in the circular cylindrical tank; this leads to a greater storage capacity of the ion exchange bed, and to a greater range in the salt loading. It is also possible, if the electrical field is shut off or fails, to temporarily treat in a conventional ion exchange operation, or to limit the regeneration of the ion exchange bed to cheaper current times. Furthermore, a functionally reliable flushing possibility for eliminating flow-obstructing deposits and for honogeneizing or treating the ion exchange bed can be provided in the circular cylndrical tank.

The advantages achieved with the present invention consists in particular in that the tank, for an apparatus for desalting water by electrodialysis, can be utilized not only for the double tank configuration of a cation exchanger/anion exchanger combination, but also individually as a single cation exchanger or as a single anion exchanger, and an economical mass production can accordingly be more easily realized.

DESCRIPTION OF PREFERRED EMBODIMENTS

Referring now to the drawing in detail, illustrated are two structurally identical tanks 10, assuming that one disregards for the time being additional installations in one of the tanks 10, as will be explained subsequently, and different complementary equipment. By means of a pedestal base 11 welded thereto, each tank 10 has a vertical orientation.

The manufacture of the tank 10 is simplified, and the maintenance of the apparatus is facilitated, because the brine chamber 12 is in a pipe or tube 14, which can be withdrawn from the tank 10 in the direction of the central longitudinal axis 13, of the tank, and is perforated in the region which receives the membrane; the tube 14 extends beyond the two ends of the circular cylindrical tank 10. The manufacture of the tank 10 is simplified even further, and the maintenance of the apparatus is further facilitated, because the electrode chamber 16, which contains the central electrode 15, is in an inner pipe or tube 17, which can be removed from the tank 10 in the direction of the tank axis 13, and is perforated in the region provided with the membrane; the inner tube 17 extends beyond the two ends of the tube 14, i.e. beyond the two ends of the brine chamber 12. Furthermore, radially extending outlets can be disposed in a particularly noninterfering manner close to the ends of the tube 14 an the inner tube 17. The brine chamber 12 has a cross-sectional area which is uniform over the entire length, and is also very elongated, which further improves circulation of the brine. Despite the small cross-sectional area of the brine chamber 12, a large membrane surface is achieved relative to the outwardly adjoining resin chamber 18 and also relative to the inwardly adjoining electrode chamber 16; this is important for providing a low electrical membrane resistance. Preferably, respective sealing threads are located at the transitions between the tank wall and the tube 14, and respective O-ring seals are disposed at transitions between the tube 14 and the inner tube 17.

The illustrated apparatus for desalting or softening water by electrodialysis is furthemore embodied in that in the tank 10, above the outer electrode chamber 19 and the resin chamber 18, there is provided a flushing chamber 20 for flushing the ion exchange resin located in the resin chamber 18; the flushing chamber 29 is sealed-off relative to the outer electrode chamber 19. Consequently, by flushing from below upwardly, the ion exchange bed located in the resin chamber 18 can be rapidly and simply retreated, and can be freed from deposits which obstruct flow-through. An increase in volume of about 60 to 80% is sufficient. Since in the radial direction the flushing chamber 20 extends to the wall of the tank, it is necessary, for the flushing operation, to lengthen the tank 10 toward the top only slightly.

Provided in the tank 10 is a water collecting chamber 23 which is separated by an annular partition 22 from the outer electrode chamber 19 and the resin chamber 18; in the region of the resin chamber 18, the partition 22 is provided with nozzles 21 which are not permeable to resin. The nozzles 21, which are preferably embodied as slotted-top nozzles, permit the passage of liquids in both directions, and at the same time retain the respective resin particles in the resin chamber 18. The manufacture of the tank 10 is further simplified, and the maintenance of the apparatus is facilitated, because the tank 10, in order to be opened, is provided with a lower pair of flanges 24 at the level of the bottom end of the outer electrode chamber 19, and is provided with an upper pair of flanges 25 at the level of the upper end of the outer electrode chamber 19.

The inner surface of the outer electrode chamber 19 ends at an outer pipe or tube 26, which, as a membrane support, is continuously perforated; at both ends, the outer tube 26 is connected with a holding ring 27 by means of a sealing thread. One of the holding rings 27 is disposed at the level of the lower flange of the upper pair of flanges 25, and the other holding ring 27 is disposed at the level of the upper flange of the lower pair of flanges 24; the holding rings 27 project inwardly from the wall of the tank 10. In a similar manner, the electrode 28 of the outer electrode chamber 19, which electrode is embodied as a circular cylindrical grid, is also held. The electrode 28 receives its electrical connection through the upper flange of the lower pair of flanges 24. The outer electrode chamber 19 communicates with a flushing tank 29, which serves as a gas outlet and a filling station, by means of the lower flange of the upper pair of flanges 25; this lower flange is enlarged and is provided with an inner annular groove. A further flushing tank 30 communicates with the upper end of the electrode chamber 16, which contains the central electrode 15.

In the case of the continuosly perforated outer tube 26, and in the case of the inner tube 17, which is perforated in the region where the membrane is supported, the cation permeable or anion permeable membrane is attached to the inside, whereas in the case of the tube 14, which is likewise perforated in the region which supports the membrane, the membrane is attached to the outside. At this point, it should be understood that the permeability of a given membrane for ions of one polarity involves the impermeability of the membrane for ions of the other polarity and for neutral charge molecules. Preferably, bandlike membrane fastening means are utilized which merely secure the front ends of the hose-like membranes all the way around. In order to replace a given membrane, it s not necessary to take the entire apparatus apart. Rather, a slight partial dismantling, which moreover does not require much maintenance, will suffice.

Taken as a whole, the drawing illustrates an apparatus for desalting or softening water by electrodialysis, and comprises two tanks 10, which are sequentially coupled by means of a transfer pipe 31, with the central electrodes 15 of the tanks 10 being interconnected by a bus bar 32; the anode 34 is disposed in the outer electrode chamber 19 of one of the tanks 10, which is designed as the cation exchange 33, and the cathode 36 is disposed in the outer electrode chamber 19 of the other tank 10, which is designed as the anion exchange 35. In this case, the anode 34 comprises titanium steel with a platinum coating, the electrolyte solution which surrounds the anode 34 comprises diluted sulfuric acid, the cathode 36 comprises V4A-steel, the electrolyte solution which surrounds the cathode 36 comprises diluted sodium hydroxide, and the electrolyte solution in the two electrode chambers 16, each of which contains a central electrode 15, comprises a sodium sulfate solution. The resin filling of the cation exchanger 33 is cation resin, and the resin filling of the anion exchanger 35 is anion resin. Arranged one after the other from the outside toward the inside in the cation exchanger 33 are two cation-permeable membranes and one anion-permeable membrane; and arranged one after the other from the outside toward the inside of the anion exchanger 35 are two anion-permeable membranes and one cation-permeable membrane.

During the electrodialysis operation of the inventive apparatus, initially cations, for example sodium ions, are forced out into the brine chamber 12 of the cation exchange 33, under the driving force of the electrical field, from the aqueous liquid which flows from the top toward the bottom in both of the tank 10, while hydrogen ions migrate thereafter from the outer electrode chamber 19 of the cation exchanger 33. Thereupon, anions, for example chloride ions, are forced out into the brine chamber 12 of the anion exchanger 35, while hydroxyl ions migrate thereafter from the outer electrode chamber 19 of the anion exchanger 35. However, due to the significantly higher ion concentration present there, the ion conveyance is predominantly effected via the ion exchange resins, with a great reduction of the electrical resistances being connected therewith, and with the narrow membrane spacings of a conventional electrodialysis apparatus, which has a correspondingly modest rate of flow, being able to be avoided. The reduction of the electrical resistance by interposing an ion exchange resin is particularly effective at a low salt content of the aqueous liquid which is to be treated, i.e. at a low ion concentration of this liquid in the end region of the water desalting. In this connection it should be noted that the separating effect of the membranes is based upon the incorporation of ion exchange substances in a carrier material. The salt brine, which during the electrodialysis operation of the apparatus becomes concentrated in the two brine chambers 12, is from time to time partially drained, accompanied by the addition of shunted-off pure water, and hence is again diluted. Ther re-dilution valve 37 is disposed on the lower pipe connection 38 of the anion exchanger 35, and the brine outlet valve 39 is disposed on the upper junction of the two brine chambers 12 and ahead of the circulation pump 40, which is common to both of the brine chambers 12.

Pursuant to a further specific embodiment of the inventive apparatus for desalting or softening water by electrodialysis, a proportionately small bottom portion of the resin chamber 18 of that tank 10 which is designed as the cation exchanger 33, is partitioned by an annular intermediate chamber 42, the top or cover 41 of which is provided with resin-impermeable nozzles 21, with the intermediate chamer 42 forming a safety filter; an intermediate chamber outlet 43, which leads from the tank 10, and a safety filter inlet 45, which leads back to the latter closely below the bottom 44 of the intermediate chamber, are bridged or spanned by the other tank 10, which is designed as the anion exchanger 35. In this way, a small supplemental tank for the safety filter can be eliminated. In particular, the brine chamber 12, the central electrode 15, the electrode 28 disposed in the outer electrode chamber 19, the one electrolytic solution which surrounds the electrode 28, and the other electrolytic solution which surrounds the central electrode 15, are used in common for two electrodialysis filters.

During a temporary breakdown, or if the electrical power is temporarily cut off, the desalting of the water can continue without interruption in a conventional filter bed process since the amount of ion exchange resin in the resin chamber 18 has a sufficient loading capacity for this purpose. Of course, without the permanent regeneration of the ion exchange resin by the force of the electrical field, the ion profile is altered in the resin chamber 18, through which the respective aqueous liquid flows from the top toward the bottom. When the electrical power is again turned on, it takes a while for the old equilibrium in the concentration of the oppositely expelled ions to be established transverse to the direction of flwo of the liquid which is to be treated, and along the lines of force of the electrical field.

Due to the flushing possibilities provided with the inventive apparatus, flow-obstructing, and hence efficiency-reducing, deposits between the resin particles can from time to time be removed in a simple manner. This is of particular significance during the treatment of turbid or pulpy aqueous liquids, such as recent wine or fruit juice. After finger-like irregularities in the distribution of the ions gradually form in the direction of the electrical field, there occurs at the same time together with the flushing an extremely advantageous retreatment of the two ion exchange beds. For this purpose, the untreated water valve 46 on the upper pipe connection 47 of the cation exchanger 33, the transfer pipe valves 48, the return line valves 49, and the pure water valve 50 are closed, and the two flushing water valves 51 on the lower pipe connection 38 of the anion exchanger 35 and on the annular intermediate chamber 42, and the two drainage valves 52 on the two upper pipe connections 47 of the two tanks 10, are opened. The flushing water pressure is regulated such that the level of the ion exchange resin rises only to just below the upper pipe connection 47, which projects from the tank 10 parallel to the axis thereof; thus, a restraining screen is not necessary.

The present invention is, of course, in no way restricted to the specifc disclosure of the specification and drawings, but also encompasses any modifications within the scope of the appended claims.

What we claim is:

1. In an apparatus for desalting water by electrodialysis, where said apparatus includes a circular cylindrical tank having an wall and a central longitudinal axis, where provided in said tank are a central electrode which extends along said central longitudinal axis of said tank, a first electrode chamber which is coaxial to said central electrode and embeds the latter in electrolyte solution, a resin chamber which is coaxial to said central electrode and contains ion exchange resin, and a brine chamber which is coaxial to said central electrode, and where the separation of adjoining chambers is effected by respective membranse, which are permeable either to cations or to anions, the improvement wherein:

said brine chamber is disposed between said first electrode chamber and said resin chamber, and a hollow cylindrical second electrode chamber, which is designed for receiving another electrolyte solution, is disposed between said resin chamber and said wall of said tank.

2. An apparatus according to claim 1, in which said brine chamber is provided in a first tube, which has two ends, both of which project beyond said tank; said first tube can be withdrawn from said tank in the direction of said central longitudinal axis thereof; said first tube is separated from said resin chamber by means of one of said membranes, and is perforated in this region.

3. An apparatus according to claim 2, in which said first electrode chamber, which contains said central electrode, is provided in a second, inner tube, which is disposed coaxially within said first tube, and has two ends, both of which respectively extend beyond associated one of said ends of said first tube; said second tube can be withdrawn from said tank in the direction of said central longitudinal axis thereof; said second tube is separated from said first tube by means of one of said membranes, and is perforated in this region.

4. An apparatus according to claim 3, in which a flushing chamber, for flushing said ion exchanger resin of said resin chamber, is disposed in said tank, between said tank wall and said first tube, and above said second electrode chamber and said resin chamber; said flushing chamber is sealed off relative to said second electrode chamber.

5. An apparatus according to claim 4, in which a water collecting chamber is provided in said tank, radially outwardly of said first tube, remote from said flushing chamber, with an annular partition separating the top of said water collecting chamber from said second electrode chamber and said resin chamber; said partition is provided with resin-impermeable nozzles in the region of said resin chamber.

6. An apparatus according to claim 5, in which, in order to permit said tank to be opened, the latter is provided with a first, lower pair of interconnectable flanges at the level of the lower end of said second electrode chamber, and a second, upper pair of interconnectable flanges at the level of the upper end of said second electrode chamber.

7. An apparatus according to claim 6, which includes two of said tanks, and a transfer pipe for sequentially coupling said tanks; a bus bar interconnects the central electrodes of said tanks; one of said tanks is designed as a cation exchanger and is provided with an anode in said second electrode chamber thereof, and the other of said tanks is designed as an anion exchanger and is provided with a cathode in said second electrode chamber thereof.

8. An apparatus according to claim 7, in which a proportionately small lower portion of said resin chamber of that tank which is designed as a cation exchanger is provided with an annular intermediate chamber, which forms a safety filter; the latter is partitioned from the resin chamber above it by a top member, and from the resin chamber below it by a bottom member; said top member is provided with resin-impermeable nozzles; said intermediate chamber is provided with an outet, and said resin chamber is provided with an inlet just below said bottom member of said intermediate chamber; said transfer pipe, in the form of first pipe means, leads from said outlet of said intermediate chamber to that tank which is designed as an anion exchanger, and second pipe means lead back from the latter to said bottom member, thus bridging said outlet and said bottom member.

* * * * *